US006493493B1

(12) United States Patent
Crafts

(10) Patent No.: US 6,493,493 B1
(45) Date of Patent: Dec. 10, 2002

(54) ECCENTRICITY DETECT AND ALIGNMENT FOR FIBEROPTIC BUNDLE

(75) Inventor: Douglas E. Crafts, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/881,524

(22) Filed: Jun. 13, 2001

(51) Int. Cl.[7] .................................................. G02B 6/04
(52) U.S. Cl. ........................................................ 385/115
(58) Field of Search ................................ 385/115, 147, 385/120, 66, 83

(56) References Cited

U.S. PATENT DOCUMENTS 5,677,973 A * 10/1997 Yuhara et al. ................ 385/90
6,011,616 A * 2/2000 Volcy et al. ............... 356/73.1
6,243,942 B1 * 6/2001 Toyoda et al. ................ 29/759
3,356,687 A1 * 3/2002 Shahid ......................... 385/49
6,371,658 B2 * 4/2002 Chong ......................... 385/52

* cited by examiner

*Primary Examiner*—Tulsidas Patel
(74) *Attorney, Agent, or Firm*—Blakely, Sokoloff, Taylor & Zafman LLP

(57) ABSTRACT

A method and apparatus for aligning eccentricities in optical fibers arrayed in a fiber optic bundle is disclosed. The optical fibers are initially constrained from movement in a lateral or longitudinal direction. A light meter is used to detect the orientation of the eccentricity in the core of at least one optical fiber. The orientations of the optical fibers can be aligned such that all optical fiber cores have the same orientation relative to the fiber optic bundle.

17 Claims, 4 Drawing Sheets

610
650
660
670
640
630
620

ECCENTRICITY DETECT AND ALIGNMENT FOR FIBEROPTIC BUNDLE

BACKGROUND

1. Field of the Invention

The invention relates to optical fiber bundle technology and more particularly relates to aligning optical fibers.

2. Related Art

Optical fibers are considered a significant improvement over the information carrying capacity of metal wires. Optical fibers have greater bandwidth than metal wires i.e. they can transmit more data per unit time than a metal wire. According to current technology a single optical fiber has the capacity to carry 8.44 megabits per second (Mbps) of data.

Bandwidth can be increased by combining optical fibers together into bundles. For example, an Optical Carrier 1 (OC1) fiber optic bundle has a bandwidth of 51.84 megabits per second. Fiber optic bundles comprise, for example, up to 40 optical fibers in a single bundle, typically in the form of a ribbon cable where all the optical fibers are side to side in a row relative to each other. There are plans to place up to 128 optical fibers in a single fiber optic bundle.

Optical fibers have a central core through which the light carrying the data must travel. The central core must line up to whatever element it is desired to receive the information carried in the light traveling through that fiber. With single fibers it is difficult enough to align the core of the fiber and the receiver of the element to which the optical fiber is to deliver the information. The difficulty in aligning multiple optical fibers is multiplied by the number of additional optical fibers in the fiber optic bundle. Within an optical fiber, the core of the fiber can have an eccentricity removing the core from the center of the fiber by as much as one micron. Contributing to this misalignment as greater numbers of optical fibers are placed in fiber optic bundles is any warp inherent in the fiber optic bundle structure. Thus, alignment issues present a significant challenge in implementing optical fiber systems.

BRIEF DESCRIPTION OF THE DRAWINGS

The invention is illustrated by way of example, and not limitation, in the figures of the accompany drawings, in which.

DETAILED DESCRIPTION

A method and apparatus for aligning optical fibers, for example, in a multiple optical fiber, fiber optic bundle is disclosed.

Reference will now be made to flowcharts and drawings. In the following drawings, like structures are provided with like reference destination. In order to show the structures of the invention more clearly, the drawings included herein are diagrammatic representations of the indicated structures. Thus, the actual appearance of the fabricated structures, for example in a photograph, may appear different while still incorporating the essential structures. Moreover, the drawings show only the structures necessary to understand that which is claimed. Additional structures known in the art have not been included to maintain the clarity of the drawings.

Figure 1:
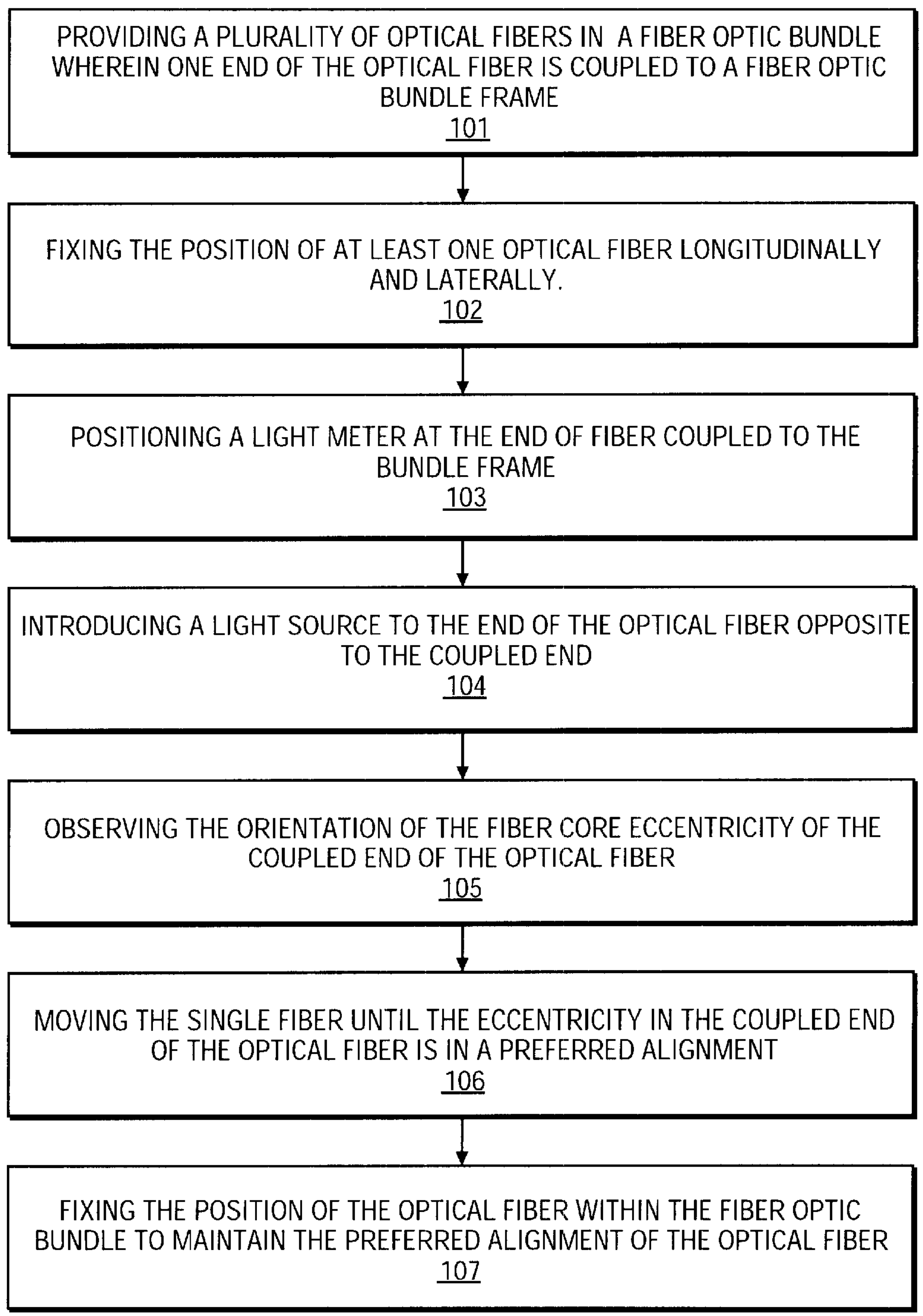
FIG. 1 is a flow diagram representing one method of aligning a plurality of optical fibers in a fiber optic bundle.

FIG. 1 is a flow diagram representing one method of reducing the insertion loss in a fiber optic bundle of multiple optical fibers by aligning the eccentricities in the optical fibers relative to a reference point in the fiber optic bundle. At least one optical fiber that is scheduled to be placed in a fiber optic bundle is coupled to a fiber optic bundle frame (block 101). The fiber optic bundle frame is the starting point for the fiber optic bundle, and organizes the more than one optical fiber allowing maintenance of some sense of coherency among the optical fibers within the fiber optic bundle. The position of at least one optical fiber within the fiber optic bundle frame is fixed in Block 102. The optical fiber is fixed within the fiber optic bundle frame, in this example, relative to longitudinal and lateral movement.

A light meter capable of recognizing the orientation of the eccentricity within an optical fiber is placed at one end of the at least one optical fiber coupled to the bundle frame in Block 103 of FIG. 1. A light source is introduced to the one end of the optical fiber opposite that end of the optical fiber coupled to the fiber optic bundle frame as described in Block 104. This light source can be any wavelength or combination of wavelengths of light but is preferably a wavelength suitable for traveling through the transmission medium that comprises the optical fibers. One suitable light source is a light source having a wavelength of 1550 nanometers. The light meter at the end of the fiber coupled to the bundled frame of the apparatus observes the orientation of the fiber core eccentricity of that end of the fiber coupled to the bundled frame, when the light source at the distal end of the optical fiber is illuminated as described in Block 105. After observing the orientation of the fiber core eccentricity in the optical fiber, the single fiber is moved until the eccentricity in the coupled end of the optical fiber is in a selected alignment relative to the fiber optic bundle frame as described in Block 106. Finally the position of the optical fiber within the fiber optic bundle frame is fixed to maintain the selected alignment of the optical fiber as described in Block 107. This process may be repeated for each of the optical fibers in a bundle having more than one fiber.

Figure 2:
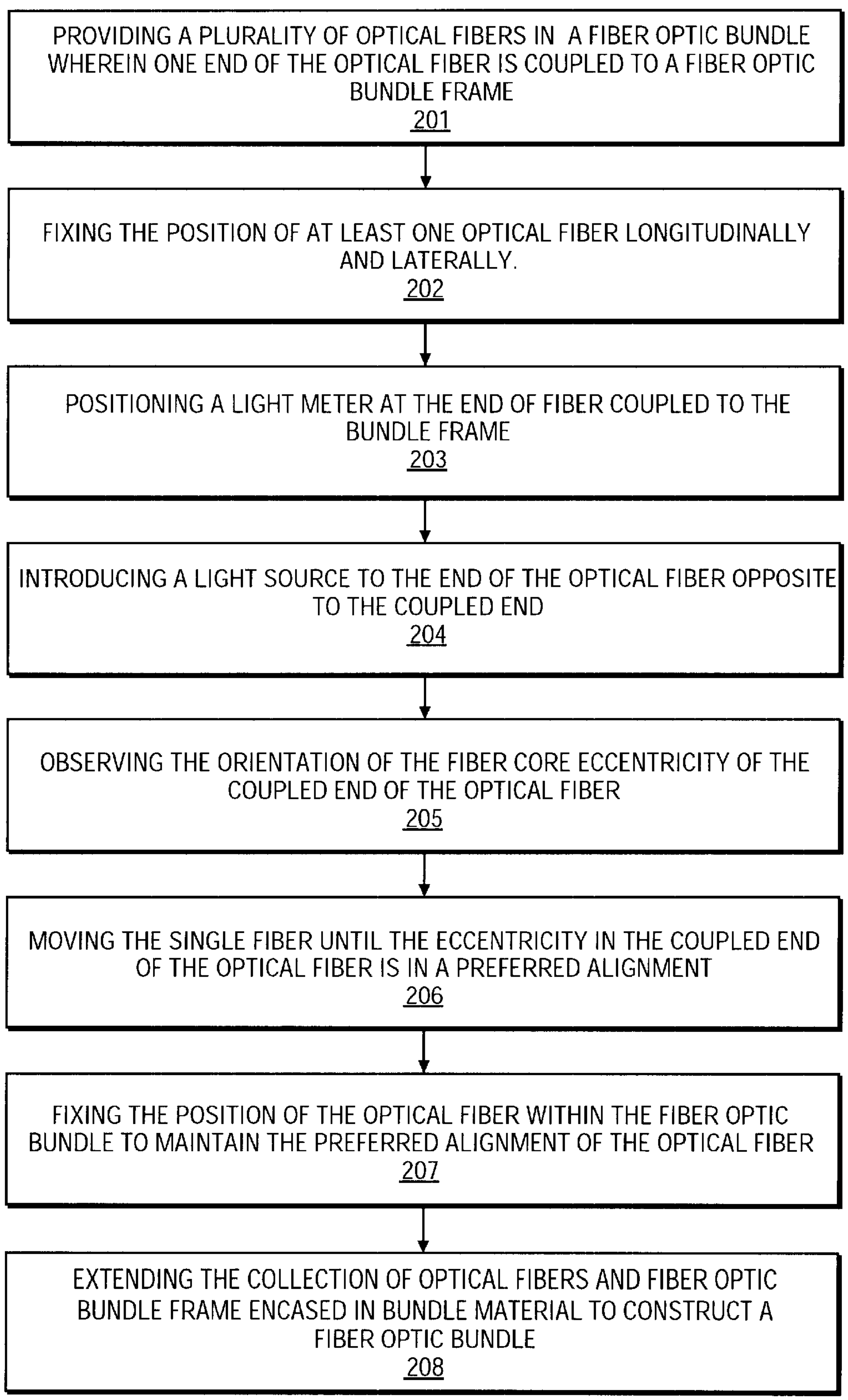
FIG. 2 is a flow diagram representing one method of forming a fiber optic bundle with the optical fibers aligned in a regular orientation with respect to each other.

FIG. 2 is a flow diagram representing one method of constructing a fiber optic bundle comprising multiple optical fibers with their eccentricities aligned relative to the fiber optic bundle frame. Aligning the eccentricities of the optical fibers enables a reduction in the insertion loss to the fiber optic bundle receiver when the fiber optic bundle is installed in a set of equipment.

Referring to FIG. 2, the method begins by providing at least one optical fiber in a fiber optic bundle wherein one end of the optical fiber is coupled to a fiber optic bundle frame as referenced in Block 201. The fiber optic bundle frame initially allows the optical fibers to be oriented relative to each other. The at least one optical fiber then has its position fixed relative to the fiber optic bundle frame longitudinally and laterally, as referenced in Block 202. Referring to block 203, a light meter is positioned at the distal end of the optical fiber to the end that is coupled to the fiber optic bundle frame. A light source is introduced to the distal end of the optical fiber opposite the end of the optical fiber coupled to the fiber optic bundle frame in Block 204. In Block 205, a light meter observes the orientation of the fiber core eccentricity in the end of the optical fiber that is coupled to the fiber optic bundle frame. After observing the eccentricity in the optical fiber coupled to the fiber optic bundle frame, the individual fiber is moved until the eccentricity of the fiber is in a selected alignment relative to the fiber optic bundle frame as referenced in Block 206. Once the position of the optical fiber within the fiber optic bundle frame is in a selected alignment, the position is fixed. The optical fiber position is fixed relative to the fiber optic bundle frame in Block 207. The fiber optic bundle frame then encases the individual optical fibers making manipulation in transport of the fiber optic bundle easier.

The process described in Blocks 202 through 207 is then repeated for each optical fiber in the bundle. Once the orientation of all of the more than one optical fibers in the fiber optic bundle frame has been placed in the selected alignment relative to the fiber optic bundle frame, the optical fibers and the fiber optic bundle frame are extended a length creating a fiber optic bundle capable of carrying the information over a great distance as referenced in Block 208.

Figure 3:
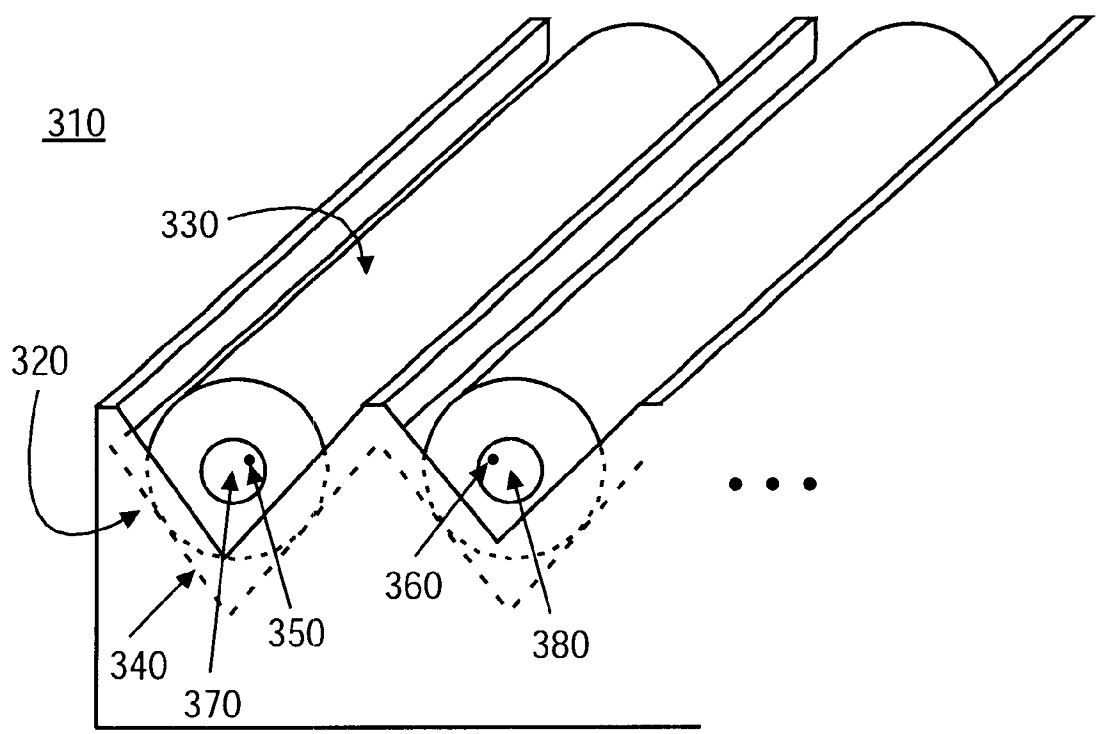
FIG. 3 is an illustration of one fiber optic bundle frame.

FIG. 3 illustrates one embodiment of the fiber optic bundle frame. Fiber optic bundle frame 310, in one embodiment, is a molded polymer material. In another embodiment, the fiber optic bundle frame is etched from a wafer of single crystal silicon. The silicon, for example, is appropriately masked with a suitable etch mask. Thereafter, symmetrically spaced unmasked areas of the substrate are exposed to a chosen anisotropic etchant, such as hot KOH or ethylenediamine. This etchant preferentially attacks a chosen (100) crystallographic plane of the silicon substrate and preferentially etches in a vertical direction until V-shaped grooves ("V-grooves") are attained. Upon completion of these V-shaped grooves, optical fibers are placed in the grooves and come to rest in alignment with the center of the V-grooves. Fiber optic bundle frame 310 has a series of "V" grooves 320 spaced parallel to one another. An optical fiber 330 rests within each "V" groove 320. Lateral movement of optical fiber 330 is restrained by "V" groove 320. Longitudinal movement of optical fiber 330 is restrained by shallow end lip 340 on fiber optic bundle frame 310, e.g. a lip at the end of each "V" groove 320. Eccentricity in optical fiber 330 can be seen in this figure by the eccentric alignment of core 350 and core 360 relative to cladding portion 370 and 380, respectively.

Figure 4:
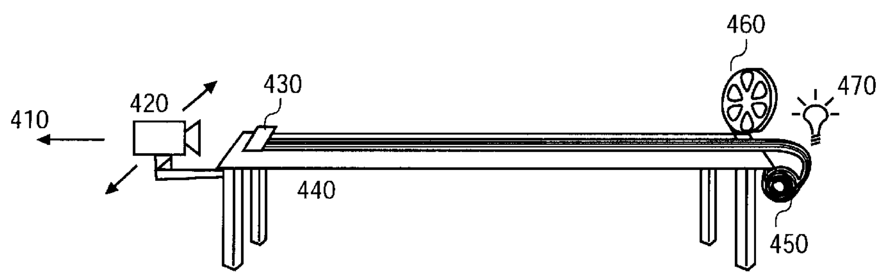
FIG. 4 is an illustration of one apparatus that allows orienting multiple optical fibers in a fiber optic bundle.

FIG. 4 illustrates one embodiment of an alignment apparatus called an assembly platform. The assembly platform 440 in FIG. 4 allows joining of multiple optical fibers with a fiber optic bundle, and aligning the eccentricities of the optical fibers within the fiber optic bundle. Multiple optical fibers in a fiber optic bundle are held in position by "V" groove clamp 430 on assembly platform 440. Light source 470 introduces bright light into a far end of an optical fiber, see for example FIGS. 5 and 6. This bright light travels the length of the optical fiber and can be detected by an optical monitor at the near end of the optical fiber. Optical monitor 420 (e.g. a video camera), is coupled to assembly platform 440 and detects and records the orientations of the optical fibers as placed in the fiber optic bundle frame. Optical monitor 420 is capable of moving along the edge of assembly platform 440 so it can be positioned in front or each of the more than one optical fiber to detect the eccentricity of each optical fiber. One way this may be accomplished is through a track coupled to assembly platform 440 with optical monitor 420 slideably coupled to the track. Fiber optic bundle supply 450 is a source of the fiber optic bundle. Fiber optic bundle frame (see FIG. 3), is part of "V" groove clamp 430 that holds together the optical fibers within the fiber optic bundle. At least one source 460 of optical fiber is available to the apparatus.

In one embodiment, the source is a reel of optical fiber. Source 460 is movable such that moving the source moves the end of the optical fiber that is attached to the fiber optic bundle frame. Light source 470 is introduced to the end of the optical fiber still within optical fiber source 460. Once the alignment of an optical fiber within the fiber optic bundle frame 430 has been determined by optical monitor 420, the source of optical fiber 460 is moved to place the eccentricity of the optical fiber in a selected alignment relative to the fiber optic bundle frame. In one embodiment this moving of the source of optical fiber is rotating the source of optical fiber. The modulus of rigidity of the optical fiber causes the first end of the optical fiber to rotate as the source reel of optical fiber is rotated. When all of the optical fibers in the fiber optic bundle frame have a selected orientation, the fiber optic bundle containing all the optical fibers can be extended a length in direction 410 to create a fiber optic bundle capable of carrying information over a great distance.

Figure 5:
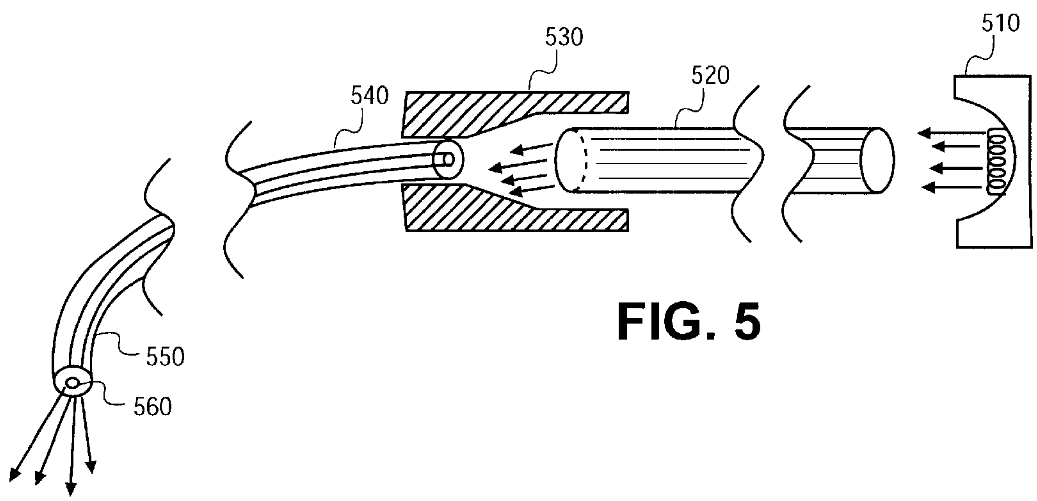
FIG. 5 is an illustration of one method of introducing a light source to an optical fiber.

FIG. 5 is an illustration of a method of introducing a light source to a length of optical fiber as was done, for example, in FIG. 4. Light from light source 510 is transmitted down light guide 520. This light may be any relevant frequency, but is preferably visible light or near infrared light in the 1300 to 1500 nm range. Coupler 530 connects light guide 520 and fiber end 540. Coupler 530 grasps and holds light guide 520 and fiber end 540 in alignment. Once coupled, light from light guide 520 is introduced into fiber end 540. Light travels along the fiber from fiber end 540 to fiber end 550, and can be observed exiting fiber core 560 (e.g. observed by a monitor). Bright light from fiber core 560 enables a high contrast imaging of the fiber core relative to the fiber cladding, or outside diameter of the fiber end. The position of the fiber core relative to the cladding or outside diameter is the eccentricity of the fiber.

Figure 6:
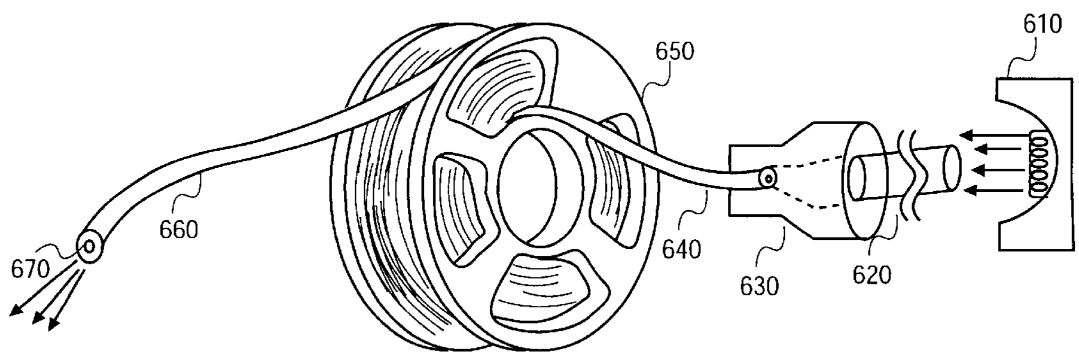
FIG. 6 is an illustration of one method of introducing a light source to an optical fiber in a reel.

FIG. 6 is an illustration of a method of introducing a light source to an optical fiber that is part of a spool of optical fiber as was done, for example, in FIG. 4. Light from light source 610 is transmitted down light guide 620. This light may be any relevant frequency, but is preferably visible light or near infrared light in the 1300 to 1500 nm range. Light guide 620 and spool end of fiber end 640 are connected by coupler 630. Coupler 630 grasps and holds light guide 620 and fiber end 640 in alignment. Coupler 630 couples the light from light guide 620 into fiber end 640. Light travels along the fiber from fiber end 640 through fiber spool 650 to fiber end 660, and can be observed exiting fiber core 670. Bright light from fiber core 670 enables a high contrast imaging of the fiber core relative to the fiber cladding, or outside diameter of the fiber end. The position of the fiber core relative to the cladding or outside diameter is the eccentricity of the fiber.

In the proceeding detailed description, specific embodiments are described. It will, however, be evident that various modifications and changes may be made thereto without departing from the broader spirit and scope of the claims. The specification and drawings are, accordingly, to be regarded in illustrative rather than restrictive sense.

What is claimed is:

1. A method comprising:

providing at least one optical fiber in a fiber optic bundle wherein a first end of the at least one optical fiber is coupled to a fiber optic bundle frame;

fixing the position of the at least one optical fiber longitudinally and laterally;

positioning a light meter at the first end of the at least one optical fiber coupled to the bundle frame;

introducing a light source to a second end of the optical fiber opposite to the first end;

moving the optical fiber until the eccentricity in the first end of the optical fiber is in a selected alignment; and fixing the position of the optical fiber within the fiber optic bundle to maintain the selected alignment of the optical fiber.

2. The method of claim 1, wherein the second end of the optical fiber is wound around a storage reel.

3. The method of claim 1, further comprising detecting the eccentricity of the first end of the optical fiber relative to the orientation of the fiber optic bundle frame.

4. The method of claim 1, wherein moving the single optical fiber until the eccentricity of the first end of the optical fiber is in a selected alignment comprises rotating the optical fiber.

5. The method of claim 1, wherein the fiber optic bundle comprises a plurality of optical fibers and selecting an alignment comprises selecting an alignment wherein the plurality of optical fibers have the identical alignment relative to the fiber optic bundle frame.

6. The method of claim 1, further comprising prior to moving the at least one fiber, detecting the orientation of the fiber core eccentricity of the first end of the optical fiber.

7. A method comprising:

providing a plurality of optical fibers in a fiber optic bundle wherein a first end of at least one of the optical fibers is coupled to a fiber optic bundle frame;

fixing the position of the at least one optical fiber longitudinally and laterally;

positioning a light meter at the first end of fiber coupled to the bundle frame;

introducing a light source to a second end of the optical fiber opposite to the first end;

detecting the orientation of a fiber core eccentricity of the first end of the optical fiber;

moving the optical fiber until the eccentricity in the first end of the optical fiber is in a selected alignment;

fixing the position of the optical fiber within the fiber optic bundle to maintain the selected alignment of the first end of the optical fiber; and extending the collection of optical fibers and fiber optic bundle frame encased in bundle material to construct a fiber optic bundle.

8. The method of claim 7, wherein the fiber optic bundle cable is a ribbon cable.

9. The method of claim 7, wherein the second end of the optical fiber is wound around a storage reel.

10. The method of claim 7, further comprising detecting the eccentricity of the first end of the optical fiber relative to the orientation of the fiber optic bundle frame.

11. The method of claim 7, wherein moving the optical fiber until the eccentricity of the first end of the optical fiber is in a selected alignment comprises rotation of the optical fiber.

12. The method of claim 7, wherein the alignment comprises a plurality of optical fibers having the identical alignment relative to the fiber optic bundle frame.

13. The method of claim 7, further comprising prior to moving the optical fiber, detecting the orientation of the fiber core eccentricity of the first end of the optical fiber.

14. An apparatus comprising:

a fiber optic bundle assembly platform having a first and second end;

a fiber optic bundle frame clamp coupled to the first end of the fiber optic bundle assembly platform;

at least one source of optical fiber containing an optical fiber moveably coupled to the second end of the fiber optic bundle assembly platform;

at least one longitudinal and lateral position optical fiber clamp coupled to the fiber optic bundle frame clamp;

at least one light meter coupled to the fiber optic bundle frame clamp positioned to observe an eccentricity in a core of the at least one optical fiber; and at least one light source, coupled to the second end of the fiber optic bundle assembly platform, positionable to introduce light into the at least one optical fiber.

15. The apparatus of claim 14, wherein the source of optical fiber is a reel or spool of optical fiber that can rotate to dispense the optical fiber.

16. The apparatus of claim 14, wherein

The source of optical fiber is a reel or spool that can also rotate in a direction normal to the direction of rotation necessary to dispense optical fiber.

17. The apparatus of claim 14, wherein the light source is a 1550 nm pump laser.

* * * * *